US012724119B2

(12) United States Patent
Glaze

(10) Patent No.: US 12,724,119 B2
(45) Date of Patent: Sep. 1, 2026

(54) URBAN CLUTTER IN WEATHER RADAR RETURNS

(71) Applicant: Honeywell International Inc., Charlotte, NC (US)

(72) Inventor: Patrick Glaze, Duvall, WA (US)

(73) Assignee: Honeywell International Inc., Charlotte, NC (US)

( * ) Notice: Subject to any disclaimer, the term of this patent is extended or adjusted under 35 U.S.C. 154(b) by 1214 days.

(21) Appl. No.: 17/249,494

(22) Filed: Mar. 3, 2021

(65) Prior Publication Data

US 2024/0310484 A1 Sep. 19, 2024

(51) Int. Cl.
*G01S 7/41* (2006.01)
*G01S 13/95* (2006.01)

(52) U.S. Cl.
CPC .............. *G01S 7/414* (2013.01); *G01S 7/412* (2013.01); *G01S 13/953* (2013.01)

(58) Field of Classification Search
CPC ........ G01S 7/414; G01S 7/412; G01S 13/953; G01S 13/5244; G01S 7/2925; G06T 7/62; G06T 2207/10032; G06T 2207/20081; G06T 2207/20084; G06T 2207/30181; G06T 7/50; G06T 17/05; G06T 7/35; G06T 7/254; G06T 2207/10028; G06T 7/579; G06T 7/596; G06T 2200/04; G06T 2207/10012; G06F 18/214; G06F 18/241; G06F 18/22; G06F 18/24; G06F 18/256; G06N 7/08; G06N 20/20; G06N 3/006; G06N 3/045; G06N 3/08; G06N 7/01; G06N 3/044; G06V 10/82; G06V 30/274; G06V 20/653; G06V 10/811; G06V 20/176; G01C 11/02; G01C 21/3673; G01C 21/3848; G01C 21/3852; G01C 21/3867; G08G 5/0004; G08G 5/003; G08G 5/0069; G08G 5/0073; G08G 5/0013; G08G 5/0026; G08G 5/0034; G08G 5/0039;

(Continued)

(56) References Cited

U.S. PATENT DOCUMENTS 5,311,183 A * 5/1994 Mathews .............. G01S 13/953
342/26 B
6,603,425 B1 * 8/2003 Woodell .................. G01S 7/414
342/75

(Continued)

OTHER PUBLICATIONS

Zhang et al., "A New Approach to Detect Ground Clutter Mixed With Weather Signals," IEEE Transactions on Geoscience and Remote Sensing, vol. 51, No. 4, Apr. 2013, pp. 2373-2387.

*Primary Examiner* — Resha Desai
*Assistant Examiner* — Remash R Guyah
(74) *Attorney, Agent, or Firm* — Shumaker & Sieffert, P.A.

(57) ABSTRACT

In some examples, a system includes a memory configured to store a weather buffer and processing circuitry configured to determine, based on radar returns, a total reflectivity value for a first voxel of the weather buffer. The processing circuitry is also configured to determine that a potential for urban clutter exists in the first voxel. The processing circuitry is further configured to assign a first portion of the total reflectivity value to the first voxel of the weather buffer in response to determining that the potential for urban clutter exists in the first voxel, where the first portion of the total reflectivity value is less than the total reflectivity value.

16 Claims, 7 Drawing Sheets

(58) Field of Classification Search
CPC .... G08G 5/0043; G08G 5/006; G08G 5/0091; G05D 1/0011
USPC .... 342/26 B, 26, 74–80, 158–164, 175, 189, 342/192–197; 382/154; 345/424; 701/14
See application file for complete search history.

(56) References Cited

U.S. PATENT DOCUMENTS

| | | | |
|---|---|---|---|
| 6,690,317 B2 | 2/2004 | Szeto et al. | |
| 7,129,885 B1 | 10/2006 | Woodell et al. | |
| 7,880,664 B2 | 2/2011 | Hannesen et al. | |
| 8,203,480 B1 * | 6/2012 | Woodell | G01S 7/4026 342/26 B |
| 8,289,202 B1 | 10/2012 | Christianson | |
| 9,897,695 B2 | 2/2018 | Vacanti | |
| 9,972,917 B2 | 5/2018 | Vacanti et al. | |
| 10,725,169 B2 | 7/2020 | Goossen et al. | |
| 2003/0006928 A1 * | 1/2003 | Szeto | G01S 7/046 342/26 B |
| 2003/0016155 A1 * | 1/2003 | Szeto | G01C 21/005 342/26 B |
| 2015/0269438 A1 * | 9/2015 | Samarasekera | G01C 21/3848 382/154 |
| 2019/0113610 A1 | 4/2019 | Vacanti et al. | |
| 2022/0215620 A1 * | 7/2022 | Lieb | G06T 7/35 |

* cited by examiner

URBAN CLUTTER IN WEATHER RADAR RETURNS

TECHNICAL FIELD

This disclosure relates to weather radar.

BACKGROUND

A radar mounted onboard an aircraft can detect weather formations (e.g., clouds, raindrops, etc.) around the aircraft based on reflections of radar signals. The radar can determine the power reflected by a weather formation and store a reflectivity value to a weather buffer. The weather buffer slices the atmosphere into voxels or cells that represent volumes of space around the aircraft. To present the weather data via the display, the radar extracts the reflectivity values from the voxels or cells of the weather buffer and presents graphical representations of the reflectivity values.

An onboard weather display can present weather formations to the flight crew of the aircraft. The weather display provides the flight crew with a representation of weather around the travel path of the aircraft. After viewing the display, the flight crew may re-route the aircraft to avoid a weather formation presented on the display.

SUMMARY

In general, this disclosure relates to distinguishing radar returns caused by weather formations and radar returns caused by urban clutter. The power reflected from a location may be caused by weather and/or manmade structures (e.g., urban clutter). A radar system may be configured to determine a total reflectivity value for location based on radar returns. The radar system may be configured to then assign a portion of the total reflectivity value to a weather buffer after determining that at least some of the radar returns from the location were caused by urban clutter.

In some examples, a system includes a memory configured to store a weather buffer. The system also includes processing circuitry configured to determine, based on radar returns, a total reflectivity value for a first voxel of the weather buffer and determine that a potential for urban clutter exists in the first voxel. The processing circuitry is also configured to assign a first portion of the total reflectivity value to the first voxel of the weather buffer in response to determining that the potential for urban clutter exists in the first voxel. The first portion of the total reflectivity value is less than the total reflectivity value.

In some examples, a method includes determining, based on radar returns, a total reflectivity value for a first voxel of a weather buffer. The method also includes determining that a potential for urban clutter exists in the first voxel. The method further includes assigning a first portion of the total reflectivity value to the first voxel of the weather buffer in response to determining that the potential for urban clutter exists in the first voxel. The first portion of the total reflectivity value is less than the total reflectivity value.

In some examples, a system includes a memory configured to store a weather buffer and processing circuitry configured to determine, based on radar returns, a total reflectivity value for a first voxel of the weather buffer. The processing circuitry is also configured to determine that a potential for urban clutter exists in the first voxel. The processing circuitry is further configured to assign a first portion of the total reflectivity value to the first voxel of the weather buffer in response to determining that the potential for urban clutter exists in the first voxel, where the first portion of the total reflectivity value is less than the total reflectivity value.

In some examples, a method includes determining, based on radar returns, a total reflectivity value for a first voxel of a weather buffer. The method also includes determining that a potential for urban clutter exists in the first voxel. The method further includes assigning a first portion of the total reflectivity value to the first voxel of the weather buffer in response to determining that the potential for urban clutter exists in the first voxel, where the first portion of the total reflectivity value is less than the total reflectivity value.

In some examples, a system includes a memory configured to store an urban clutter database including a representation of an urban area, store a weather buffer, and store a non-weather buffer. The system also includes an antenna configured to transmit radar signals towards a location represented by a first voxel of the weather buffer. The antenna is also configured to receive reflections of the radar signals from the location. The system further includes processing circuitry configured to determine a total reflectivity value for the first voxel based on the reflections of the radar signals. The processing circuitry is also configured to determine that the first voxel at least partially overlaps with the urban area and determine that a potential for urban clutter exists in the first voxel in response to determining that the first voxel at least partially overlaps with the urban area. The processing circuitry is further configured to determine a first portion of the total reflectivity value is attributable to weather based on the representation of the urban area stored in the urban clutter database. The processing circuitry is further configured to assign the first portion of the total reflectivity value to the first voxel of the weather buffer, wherein the first portion of the total reflectivity value is less than the total reflectivity value. The processing circuitry is also configured to determine a second portion of the total reflectivity value is attributable to the urban clutter based on the representation of the urban area stored in the urban clutter database. The processing circuitry is further configured to assign the second portion of the total reflectivity value to a corresponding voxel of the non-weather buffer, where the corresponding voxel at least partially overlaps with the first voxel.

The details of one or more examples of the disclosure are set forth in the accompanying drawings and the description below. Other features, objects, and advantages will be apparent from the description, drawings, and claims.

DETAILED DESCRIPTION

Various examples are described below for assigning radar returns to a weather buffer. The radar signals received by a radar system may have been reflected by a weather formation (e.g., a cloud or water droplet), by the ground, and/or by manmade structures. By itself, the electromagnetic power received by a radar system does not provide any indication of what caused a reflection. Even at cruise altitudes above ten kilometers, the main lobe of a beam angled slightly downward may hit the ground surface at a range of one or two hundred kilometers. Thus, manmade structures at long range that are well below the altitude of an aircraft can still reflect radar signals back to the aircraft. The radar system may treat the radar signals reflected by the manmade structures as if the radar signals were instead reflected by a weather formation. The radar system may then present, via a display, a graphical representation that looks like a storm cell, even where the radar returns were actually reflected by manmade structures. In addition, the display may present the graphical representation as having a large vertical extent, similar to the vertical extent of a storm cell, even though the manmade structure are many kilometers below the altitude of the aircraft.

To reduce the likelihood that manmade structures are presented as convective storm cells, an urban clutter database may store representations of urban areas and other areas of manmade structures. The urban clutter database may be used to apportion radar returns between a weather buffer and a non-weather buffer. Thus, the weather data presented to a user may more accurately indicate the actual weather conditions, rather than depicting manmade structures as storm cells.

Figure 1:
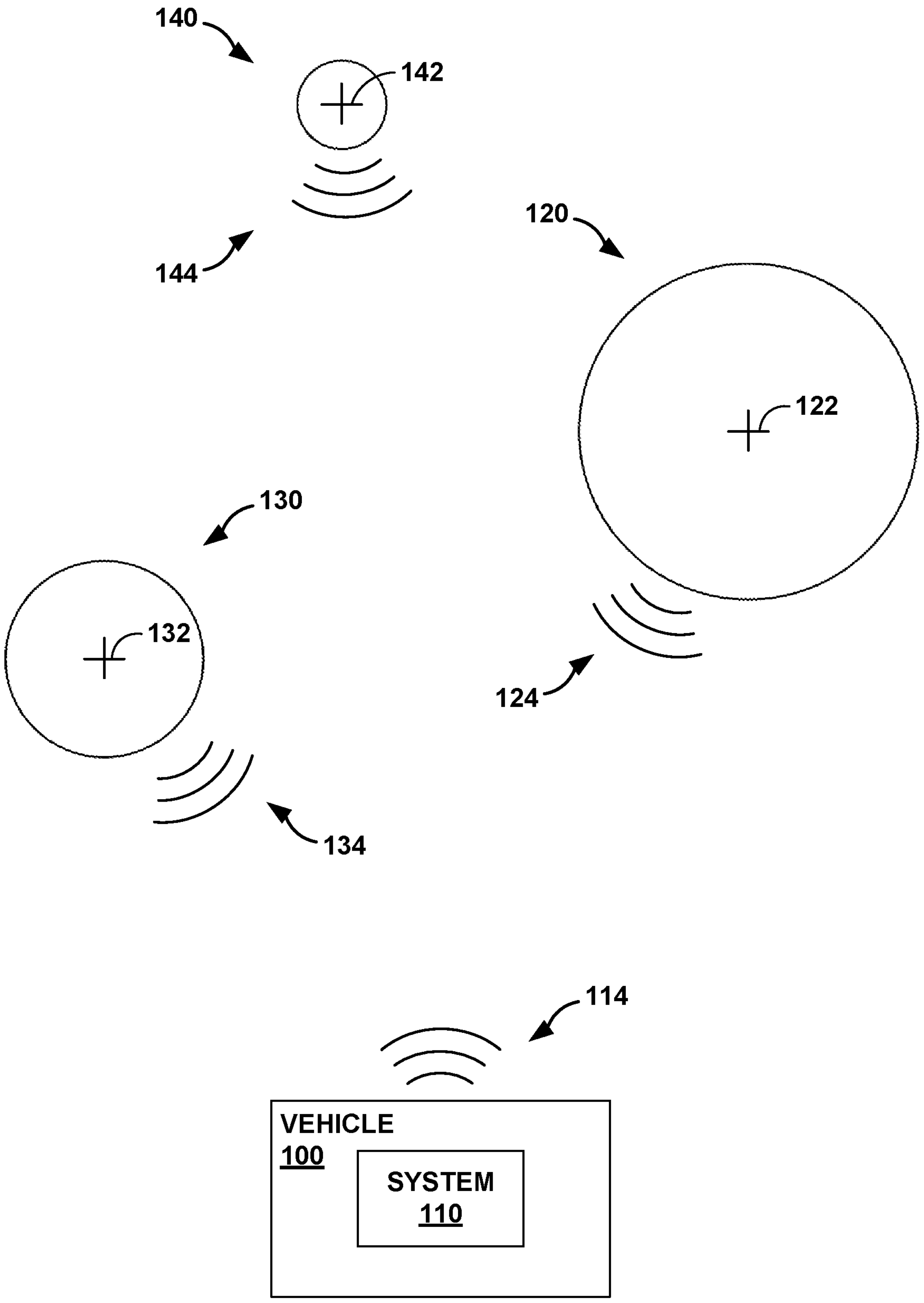
FIG. 1 is a conceptual block diagram of a vehicle including a system for transmitting and receiving radar signals, in accordance with some examples of this disclosure.

FIG. 1 is a conceptual block diagram of a vehicle 100 including a system 110 for transmitting radar signals 114 and receiving radar signals 124, 134, and 144, in accordance with some examples of this disclosure. After system 110 transmits radar signals 114, radar signals 114 may reflect off of urban areas 120, 130, and 140 as reflected radar signals 124, 134, and 144. Although not shown in FIG. 1, radar signals 114 may also reflect off of terrain, birds, and weather formations such as clouds, rain, and partially or completely frozen water.

Although this disclosure describes examples of aircraft transmitting and receiving radar signals, vehicle 100 may include any type of vehicle. In some examples, vehicle 100 may be an aircraft such as an unmanned aerial vehicle, airplane, helicopter, and/or weather balloon. Vehicle 100 may be a land vehicle such as an automobile and/or a water vehicle such as a ship or submarine. Vehicle 100 may be a manned vehicle or an unmanned vehicle, such as a drone, a remote-control vehicle, an urban air mobility system, or any vehicle with or without a pilot or crew on board. In some examples, the techniques of this disclosure may be implemented by a stationary radar system such as a ground-based radar.

Vehicle 100 includes system 110 that is configured to transmit radar signals 114 and receive reflected radar signals 124, 134, and 144. System 110 may be configured to determine the approximate location at which each radar signal was reflected back to vehicle 100 based on the time of arrival and the angle of arrival. For example, system 110 may be configured to transmit radar signals 114 as a wide beam and form narrower beams on receive. System 110 can partition the received energy into voxels or cells, where the size of cells increases as the distance from vehicle 100 increases. Additional example details of weather radar are described in commonly assigned U.S. Pat. No. 9,897,695, entitled "Digital Active Array Radar," which issued on Feb. 20, 2018; U.S. Pat. No. 9,972,917, entitled "Digital Active Array Radar," which issued on May 15, 2018; U.S. Pat. No. 10,725,169, entitled "Integrated Radar and ADS-B," which issued on Jul. 28, 2020; and U.S. Patent Application Publication No. 2019/0113610, entitled "Digital Active Phased Array Radar," which was filed on Feb. 5, 2018, the entire contents of which are incorporated herein by reference.

As described in further detail herein, system 110 can store weather data (e.g., reflectivity values) in one or more three-dimensional volumetric buffers of cells or voxels. The cells or voxels each represent a volume of space, which may be rectangle-shaped or cube-shaped. In some examples, the sides of each voxel may be flat, curved, square-shaped, and/or rectangle-shaped. At longer ranges (e.g., distances from vehicle 100), the voxels of the buffer may be larger. In other words, at longer ranges, the voxels in a buffer may represent larger vertical spans, as compared to the voxels that are closer to vehicle 100. The data stored in a particular voxel provides only a measure of the reflectiveness associated with the volume represented by the particular voxel. However, the reflectivity value stored in the weather buffer may not provide any information about what portion of the voxel includes objects that are reflecting radar signals. In addition, the reflectivity value may not provide any information about which objects caused the radar signals to reflect back to system 110.

In some examples, system 110 may have access to a terrain database with expected reflectivities of terrain at various locations. For each voxel in the buffer, system 110 may be configured to query the terrain database for the existence of terrain features in the respective voxel and the expected reflectivity of any such terrain features. System 110 may partition the reflected power from a volume of space into weather-caused reflectivity and terrain-caused reflectivity based on the information stored in the terrain database. System 110 may also use Doppler clutter suppression to automatically reduce clutter and therefore reduce workload associated with calculating and setting the tilt of an antenna. For example, system 110 may determine an estimated terrain-caused reflectivity received from the volume of space based on information from the terrain database and assign this estimated reflectivity value to the non-weather buffer. System 110 may then assign the remainder of the reflected power to the weather buffer.

However, the terrain database may not include information about the reflectivity of manmade structures, especially those structures in an urban area. In some cases, manmade structures have a much higher reflectivity for radar signals than terrain features, especially at long ranges because beamwidth increases with range. Thus, a terrain-only database will not account for highly reflective urban areas and other areas with manmade structures.

An existing radar system may use a terrain database to discriminate between reflectivity caused by weather formations and terrain. Urban areas 120, 130, and 140 will highlight a weakness in the existing model because the terrain database does not account for the reflectivity of urban areas 120, 130, and 140. As a result, the existing radar system will present a weather map with indications of high reflectivity around urban areas 120, 130, and 140. An operator of vehicle 100 who identifies clutter on the display may become dissatisfied with the display. An operator who does not identify the depicted weather on an existing display as clutter may maneuver vehicle 100 to avoid urban areas 120, 130, and 140, which can increase travel time and fuel consumption.

In accordance with the techniques of this disclosure, system 110 may have access to an urban clutter database that includes information regarding urban areas 120, 130, and 140. For example, the urban clutter database may include information for each urban area such as location information such as a center location, extent information such as a radius, an elevation, intensity information such as a reflectivity magnitude, a shape, and/or a reflectivity distribution model. System 110 can use this information to bias radar return discrimination toward weather or toward ground, thereby partitioning the reflected power from a volume of space into weather-caused reflectivity and urban-caused reflectivity. For example, in areas identified in the database as having as high urban clutter, system 110 may be less likely to assign strong returns to the weather buffer and more likely to assign at least a portion of these returns to ground clutter. Without an urban clutter database, system 110 may not be able to distinguish between energy reflected from weather, terrain, and urban areas 120, 130, and 140.

For example, system 110 may determine an estimated manmade-structure-caused reflectivity from the volume of space based on a beam model and further based on information from the urban clutter database and assign this estimated reflectivity value to the non-weather buffer. System 110 may then assign the remainder of the reflected power to the weather buffer. Additionally or alternatively, system 110 may be configured to determine an estimated percentage of reflectivity from the volume of space that is caused by manmade structures in the volume of space. System can make this determination based on a beam model and further based on information from the urban clutter database. In some examples, system may also determine an estimated percentage of reflectivity from the volume of space that is caused by terrain features in the volume of space. System 110 can multiply the power reflected from the volume of space by the estimated percentage to determine the power reflected by manmade structures. System 110 can assign the remaining power to the weather buffer.

In other words, system 110 may first determine a total reflectivity value for a volume of space (e.g., a cell or voxel) based on the radar returns from that volume of space. System 110 may be configured to then determine a modified reflectivity value based on urban clutter information stored to a memory that is onboard vehicle 100 and/or in the cloud. The modified reflectivity value may be a portion of the total reflectivity value that is attributable to weather formations in the volume of space. System 110 can determine the modified reflectivity value by subtracting an expected reflectivity value caused by manmade structures from the total reflectivity value and/or by multiplying the total reflectivity value by a factor representing a percentage of reflectivity that is expected to be caused by manmade structures. System 110 may be configured to increase the manmade-structure contribution or decrease the weather contribution in areas that have been recorded as producing clutter returns in the past.

The use of an urban clutter database allows for more accurate biasing and discrimination of radar returns. For example, system 110 may determine a portion of reflectivity that is likely attributable to manmade structures and assign that portion to a non-weather buffer. System 110 may be configured to present the data stored in the weather buffer to the operator of vehicle 100. Thus, the operator of vehicle 100 will see a more accurate depiction of the weather around vehicle 100 because system 110 may be configured to discriminate between reflectivity caused by weather formations, reflectivity caused by terrain, and/or reflectivity caused by urban areas 120, 130, and 140.

Urban areas 120, 130, and 140 may include towns, cities, industrial areas, oil fields, military bases, and/or any other area with manmade structures that reflect radar signals 124, 134, and 144 back towards vehicle 100. Urban areas 120, 130, and 140 may include structures with high reflectivity such as glass-exterior buildings, communication towers, and moving objects such as oil pumpjacks. Other example areas of manmade structures include highways, oil refineries and ethanol refineries, agriculture facilities, seaports, power plants (e.g., hydroelectric dams and nuclear cooling towers), sports stadiums, monuments, observatories, chimneys and smokestacks, transmission towers, wind turbines, construction cranes, water towers, satellite dishes, amusement parks, among others. Moving structures such as pumpjacks, automobiles on a highway, and wind turbines may result in a motion artifact that a radar system interprets as weather or turbulence.

Urban areas 120, 130, and 140 are depicted as circular areas, but urban areas 120, 130, and 140 may have any shape, as viewed from above. System 110 may attribute a shape to each of urban areas 120, 130, and 140 either by default or based on data stored in the urban clutter database. For example, the urban clutter database may include an indication that the reflectivity of urban area 120 should be modeled as a circle, the reflectivity of urban area 130 should be modeled as a square, and the reflectivity of urban area 140 should be modeled as a non-square polygon, as viewed from above. Other potential shapes include ovals, triangles, rectangles, pentagons, hexagons, and so on.

The urban clutter database may store locations 122, 132, and 142 of urban areas 120, 130, and 140. For each urban area stored in the urban clutter database, there may be one or more locations stored in the database. For example, locations 122, 132, and 142 are shown at the center of urban areas 120, 130, and 140, but the urban clutter database may additionally or alternatively store the foci of an ellipse, the vertices of a polygon, and/or the centers of multiple high-reflectivity areas within a single urban area (e.g., a downtown area, an industrial area, and a suburban office park area). The urban clutter database may also store a radius for each of urban areas 120, 130, and 140, where system 110 may be configured to model urban area 120 based on location 122 and the associated radius.

Figure 2A:
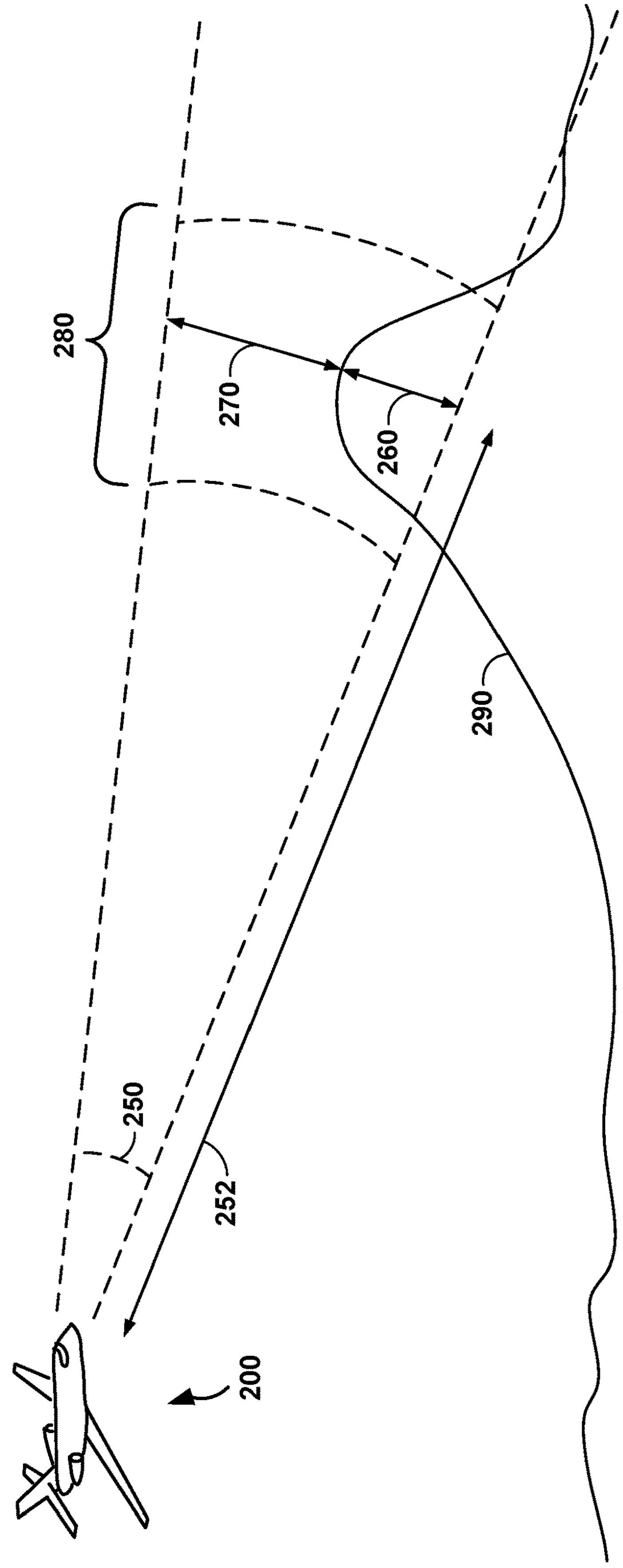
FIGS. 2A and 3 are side-view diagrams of a vehicle approaching terrain or an urban area, in accordance with some examples of this disclosure.
Figure 3:
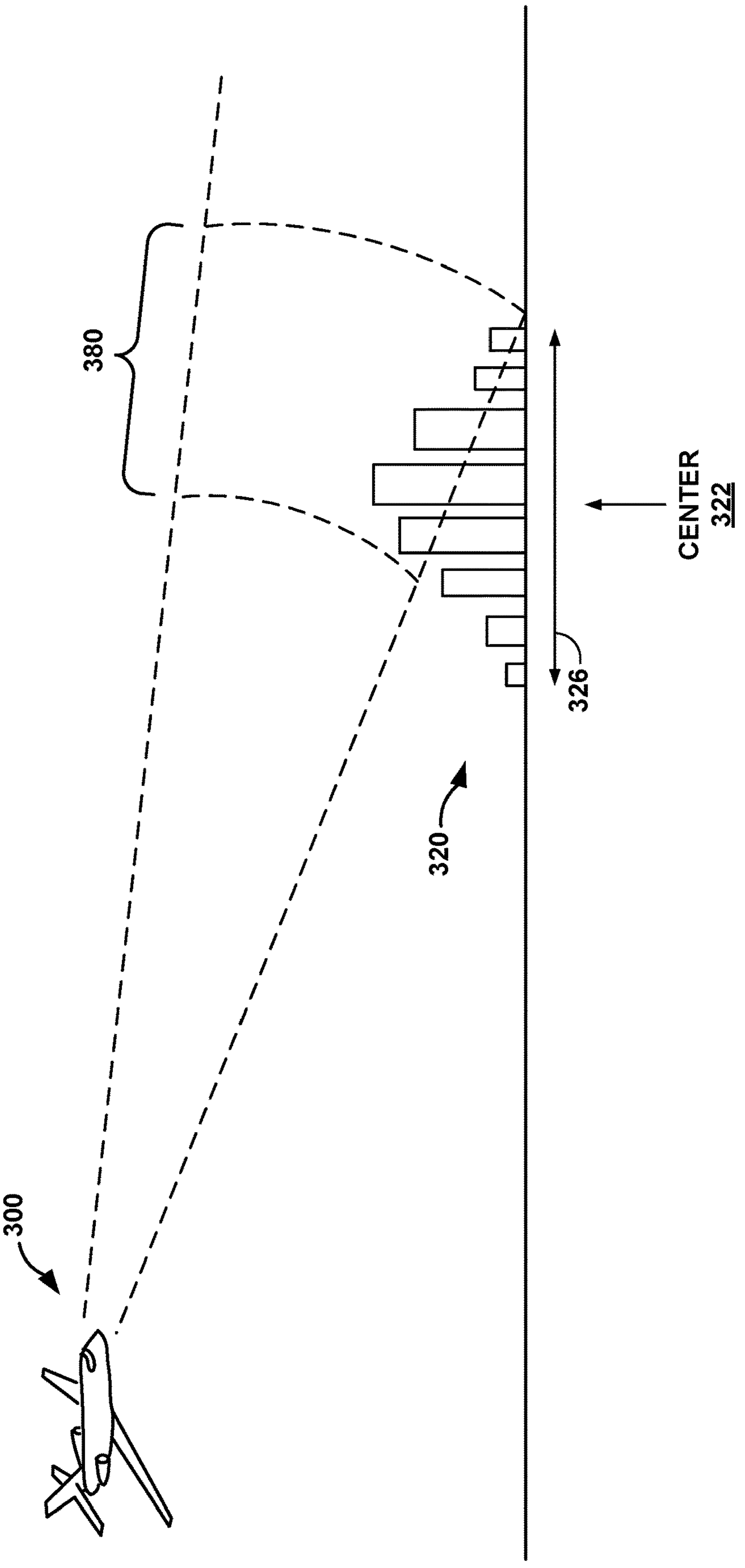

FIGS. 2A and 3 are side-view diagrams of vehicles 200 and 300 approaching terrain 290 or an urban area 320, in accordance with some examples of this disclosure. Vehicle 200 is depicted as an aircraft transmitting or receiving a beam of radar signals at an angle slightly below horizontal, but other non-aircraft systems may transmit radar signals towards terrain 290 or receive radar signals from terrain 290. In some examples, a radar system onboard vehicle 200 may transmit a wide beam and form a narrower beam on receive, where the receive beam is bounded by angle 250. Angle 250 may be approximately two, three, or four degrees wide, depending on the characteristics of the antenna mounted onboard vehicle 200. Smaller antennas may have larger beamwidths, such can result in urban clutter bleed through at relatively short ranges.

A system onboard vehicle 200 may define voxel 280 as centered at range 252 and bounded by angle 250. The system can store one or more reflectivity values for voxel 280 indicating the radar returns reflected back to vehicle 200. A first reflectivity value may represent the estimated radar returns caused by weather formations, and a second reflectivity value may represent the estimated radar returns caused by terrain 290.

Voxel 280 may have two segments 260 and 270, as viewed from vehicle 200. Segment 260 represents the portion of voxel 280 where terrain 290 increases the radar returns reflected back to vehicle 200. Segment 270 represents the portion of voxel 280 where terrain 290 does not increase the radar returns reflected back to vehicle 200. Equation (1) represents the relationship between the heights of segments 260 and 270, range 252, and angle 250. Although FIG. 2 depicts the heights of segments 260 and 270 as not exactly vertical, angle 250 may be sufficiently large, and range 252 may be sufficiently large that the heights of segments 260 and 270 are almost vertical.

$$\text{Height of cell 280} = H_{260} + H_{270} \approx \text{distance}_{252} \times \theta_{250} \tag{1}$$

Figure 2B:
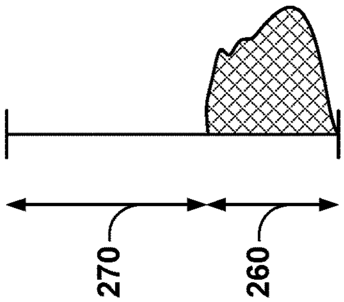
FIG. 2B is a diagram of the radar returns by altitude, in accordance with some examples of this disclosure.

FIG. 2B is a diagram of the radar returns by altitude. To determine the radar returns from voxel 280 that are attributable to weather, the system onboard vehicle 200 may be configured to multiply the total reflectivity ($R_{total}$) received from voxel 280 by the percentage of voxel 280 that will be affected by terrain, as shown in Equation (2). Another potential method is to subtract an expected reflectivity from voxel 280 that is caused by terrain 290 from the total reflectivity received from voxel 280. A terrain database may store information that allows the system to determine the height of segment 260 and/or the expected reflectivity from voxel 280 that is caused by terrain 290.

$$R_{modified} = R_{total} \times \frac{H_{270}}{H_{260} + H_{270}} \tag{2}$$

Equation (2) assumes that the power received in a beam is spread evenly across angle 250, and no power is received outside of angle 250. In reality, power in the main lobe of a beam is not evenly distributed across the main lobe. Moreover, there is some power in sidelobes outside of the main lobe. Thus, a beam model can be used to determine the portions of a beam that will reflect off of terrain 290. Based on this determination, a system can determine the portion of power received in a beam that is attributable to reflections from terrain 290.

Vehicle 200 may include a positioning device for determining the latitude, longitude, and altitude of vehicle 200. Using angle 250 and range 252, the system may be configured to determine location of voxel 280 relative to vehicle 200. Using the relative location of voxel 280 and the absolute location of vehicle 200, the system can determine the absolute location of voxel 280. Therefore, the system can determine the height of segments 260 and 270 based on the absolute location of voxel 280 and information retrieved from a terrain database. In clear conditions, the reflectivity from segment 270 may be very low compared to the reflectivity from segment 260, as shown in FIG. 2B. However, in examples in which weather formations exist in voxel 280, some of the radar returns from voxel 280 may be caused by weather.

FIG. 3 is a side-view diagram of vehicle 300 approaching urban area 320. Part of voxel 280 includes the manmade structures of urban area 320, bounded by diameter 326 around center 322. The system onboard vehicle 300 can first determine a total reflectivity value for voxel 380. To discriminate or bias the radar returns received from voxel 380, the system may be configured to then determine a modified reflectivity value that represents an estimate of the reflectivity that is caused by weather formations. To determine the modified reflectivity value, the system may retrieve information from an urban clutter database, such as center 322, diameter 326, the altitude of urban area 320, the reflectiveness of urban area 320, and/or the distribution of reflectiveness within urban area 320.

$$R_{weather\ buffer} = R_{modified} = R_{total} \times (1 - K_{urban}) \tag{3}$$

$$R_{urban} = R_{total} \times K_{urban} \tag{4}$$

The system may be configured to use Equations (3) and (4) to determine the reflectivity attributable to weather and urban area 320. The system may determine the urban clutter factor ($K_{urban}$) for voxel 380 based on the location of voxel 380 and the information retrieved from the urban clutter database. The urban clutter factor may be expressed as a value between one and zero or as a percentage between one hundred percent and zero percent. In Equations (3) and (4), the reflectivities attributable to weather and urban area 320 sum to the total radar return power received from voxel 380, but in some examples, the reflectivities may not sum to the total reflectivity.

In addition to or as an alternative to Equations (3) and (4), the system may determine an expected reflectivity for the portion of urban area 320 that is inside of voxel 380 based on information retrieved from the urban clutter database. The system may be configured to determine the reflectivity value attributable to weather by subtracting the expected urban reflectivity from the total reflectivity received from voxel 380.

In some examples, a database may include both terrain information and urban clutter information. A system onboard may be configured to determine a combined factor (K) for voxel 380 that represents the reflectivity of the terrain and urban area 320 inside of voxel 380. The combined factor can be represented as an estimated reflectivity value caused by the terrain and urban area 320, as a percentage of the reflectivity caused by the terrain and urban area 320, and/or as another representation of the terrain and urban reflectivity in voxel 380.

FIGS. 4A-4E are side-view conceptual diagrams of reflectivity distributions for an urban area, in accordance with some examples of this disclosure. The vertical axis of the plots shown in FIGS. 4A-4E represents a magnitude of reflectivity, and the horizontal axis of the plots represents distance from the center of the urban area. A system implementing the techniques of this disclosure may use one or more of the distribution models shown in FIGS. 4A-4E or other distribution models not depicted herein. The distribution models illustrated in FIGS. 4A-4E may be stored in the urban clutter database. In other words, the database may store the specific layout of the distribution model to use. Additionally or alternatively, in examples in which the urban clutter database does not store a distribution model, the system may have a default distribution model or a technique for determining which distribution model to use for an urban area. In some examples, the urban clutter database may store a parameter, where the system selects a distribution model based on a value of the parameter.

In some examples, for each urban area, the urban clutter database may store a first value (e.g., 427A-427E) indicating a radius of the urban area and a second value (e.g., 428A-428E) indicating a maximum value of a reflectivity factor. The maximum value of the reflectivity may be a value of the intensity of the reflections caused by the urban area. The distribution models shown in FIGS. 4B-4E assume a higher estimated reflectivity at the center of the urban area with reduced reflectivities at locations away from the center of the urban area.

Figure 4A:
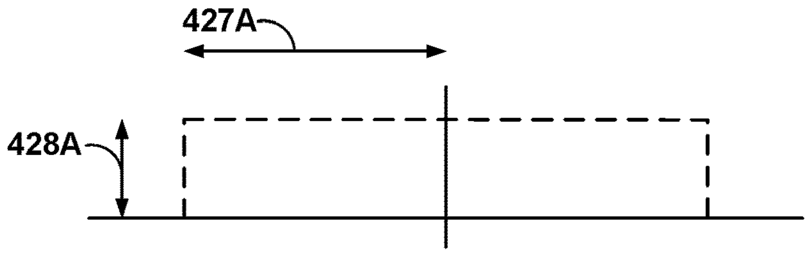
FIGS. 4A-4E are side-view conceptual diagrams of reflectivity distributions for an urban area, in accordance with some examples of this disclosure.
Figure 4B:
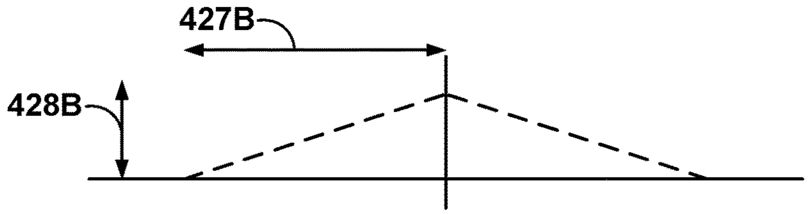

In the example distribution shown in FIG. 4A, the expected reflectivity caused by the manmade structures of the urban area is constant across the urban area. Thus, the expected reflectivity is constant at a value equal to factor 428A throughout the area defined by radius 427A. In the example distribution shown in FIG. 4B, the expected reflectivity caused by the manmade structures of the urban area decreases linearly from maximum value 428B in proportion to the distance from the center of the urban area, as shown in Equation (5). Thus, the urban clutter factor is based on a ratio of the radius and the distance between the center position of the urban area.

$$K_{urban} = (\text{radius}_{427B} - \text{distance}_{from\ center}) \times K_{428B} \quad (5)$$

$$K_{urban} = \left(1 - \frac{(\text{distance}_{from\ center})^2}{(\text{radius}_{427C})^2}\right) \times K_{428C} \quad (6)$$

Figure 4C:
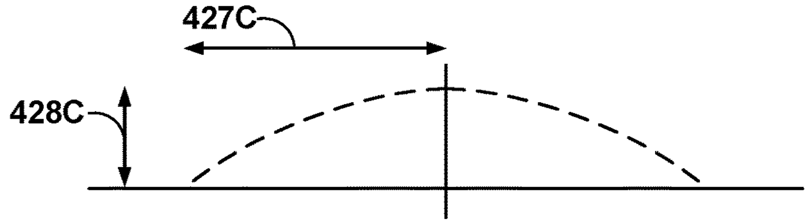
Figure 4D:
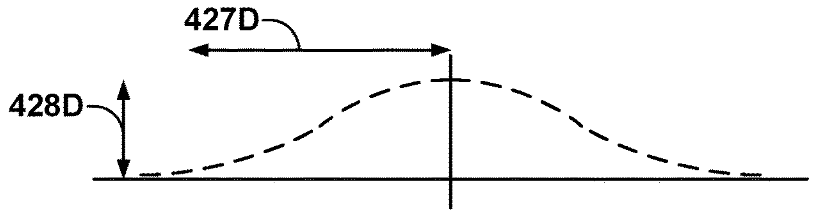
Figure 4E:
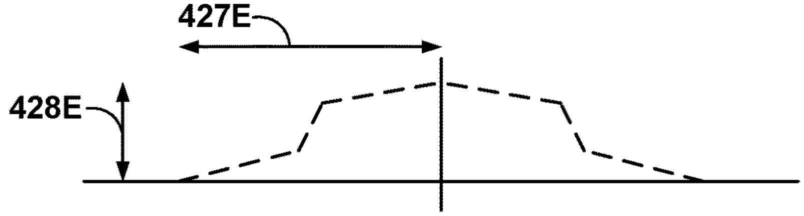

In the example distribution shown in FIG. 4C, the expected reflectivity caused by the manmade structures of the urban area decreases from maximum value 428C in a parabolic manner to zero at the edge of radius 427C, as shown in Equation (6). In the example distribution shown in FIG. 4D, the expected reflectivity caused by the manmade structures of the urban area decreases from maximum value 428D according to a Gaussian function, where radius 427D may represent some multiple of the standard deviation. In the example distribution shown in FIG. 4E, the expected reflectivity caused by the manmade structures of the urban area decreases from maximum value 428E according to a piecewise linear function.

Figure 5:
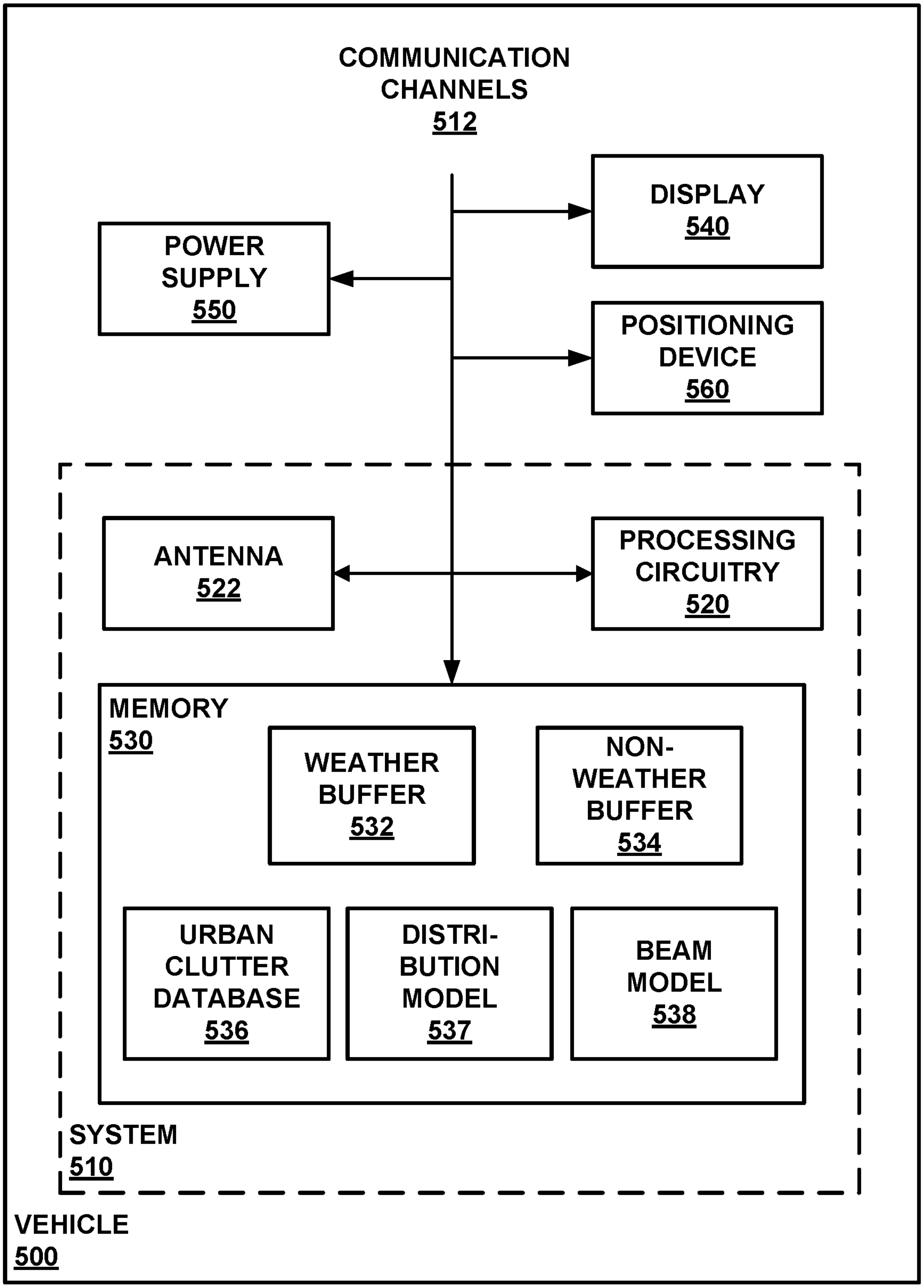
FIG. 5 is a conceptual block diagram of a system mounted onboard a vehicle, in accordance with some examples of this disclosure.

FIG. 5 is a conceptual block diagram of a system 510 mounted onboard a vehicle 500, in accordance with some examples of this disclosure. System 510 includes processing circuitry 520, antenna 522 for transmitting and receiving radar signals, and memory 530 for storing weather buffer 532. Display 540, power supply 550, and positioning device 560 may also be mounted on vehicle 500. In some examples, one or more of display 540, power supply 550, and positioning device 560 may be part of system 510 even though FIG. 5 depicts those components outside of system 510. Vehicle 500 includes communication channels 512 connecting the components of vehicle 500 such that any component may be configured to communicate with any other component of system 510. System 510 can also include optional components such as an inertial navigation system (INS) and sensors, even though these components are not shown in FIG. 5.

Processing circuitry 520 may be configured to determine total reflectivity values for locations based on reflected radar signals received by antenna 522. Processing circuitry 520 may be configured to also determine the portion of the total reflectivity values attributable to weather formations and store the modified reflectivity values to weather buffer 532. In addition, processing circuitry 520 may be configured to store the remaining portion of the total reflectivity value to optional non-weather buffer 534. The volume represented by a voxel in weather buffer 532 may be identical to the volume represented by the corresponding voxel in non-weather buffer 534. However, non-weather buffer 534 may have a different resolution than weather buffer 532, such that the dimensions and locations of the voxels in buffers 532 and 534 may not be identical. In other words, the volume represented by a voxel in weather buffer 532 may not exactly overlap with the volume represented by a corresponding voxel in non-weather buffer 534. In some examples, system 510 is configured to transmit the data stored in buffers 532 and/or 534 to an external receiver, such as a base station, a ground station, and/or another vehicle.

Processing circuitry 520 may retrieve information from urban clutter database 536, such as the location, center, radius, shape, maximum reflectivity value, and distribution model for an urban area. Urban clutter database 536 can store information on urban areas that are high clutter producers. Urban clutter database 536 may also include terrain information to allow processing circuitry 520 to discriminate between weather-caused reflectivity, on the one hand, and terrain-caused or urban-caused reflectivity, on the other hand. Although FIG. 5 depicts urban clutter database 536 as stored to memory 530, urban clutter database may be stored to a memory outside of system 510 such as a memory in a cloud network.

In some examples, distribution model 537 for urban areas may be stored outside of urban clutter database 536. Processing circuitry 520 may be configured to use beam model 538 and other information such as the tilt of antenna 522 to allocate power along the extent of a beam. For example, using beam model 538, processing circuitry 520 may allocate power to the center lobe of a beam and may also allocate some power to the sidelobes of the beam. A side lobe of the beam may have a lower power allocation than the main lobe of the beam.

Processing circuitry 520 may include any suitable arrangement of hardware, software, firmware, or any combination thereof, to perform the techniques attributed to processing circuitry 520 herein. Examples of processing circuitry 520 include any one or more microprocessors, digital signal processors (DSPs), application specific integrated circuits (ASICs), field programmable gate arrays (FPGAs), or any other equivalent integrated or discrete logic circuitry, as well as any combinations of such components. When processing circuitry 520 includes software or firmware, processing circuitry 520 further includes any hardware for storing and executing the software or firmware, such as one or more processors or processing units.

Processing circuitry 520 may be communicatively coupled to memory 530, which is configured to store data. Memory 530 may include any volatile or non-volatile media, such as a random access memory (RAM), read only memory (ROM), non-volatile RAM (NVRAM), electrically erasable programmable ROM (EEPROM), flash memory, and the like. In some examples, memory 530 may be external to processing circuitry 520 (e.g., may be external to a package in which processing circuitry 520 is housed).

Positioning device 560 is configured to determine the position or location of vehicle 500. Positioning device 560 may include satellite navigation equipment such as a GNSS configured to receive positioning signals from satellites and other transmitters. One example of a GNSS is a Global Positioning System (GPS). In some examples, positioning device 560 is configured to deliver the received positioning signals to processing circuitry 520, which may be configured to determine the position of vehicle 500.

In examples in which system 510 includes an INS, the INS may be configured to determine the velocity and/or orientation of vehicle 500. To determine the orientation of vehicle 500, the INS may be configured to determine the pitch, roll, and yaw of vehicle 500. In some examples, the INS can also determine the relative position of vehicle 500 using dead reckoning. System 510 may also include sensors such as one or more accelerometers (angular and/or linear accelerometers), one or more gyroscopes, one or more magnetic sensors, one or more speed sensors, and/or an altimeter. Some or all of the sensors, such as one or more accelerometers and/or one or more gyroscopes, may be part of an INS or may provide data to an INS.

Figure 6:
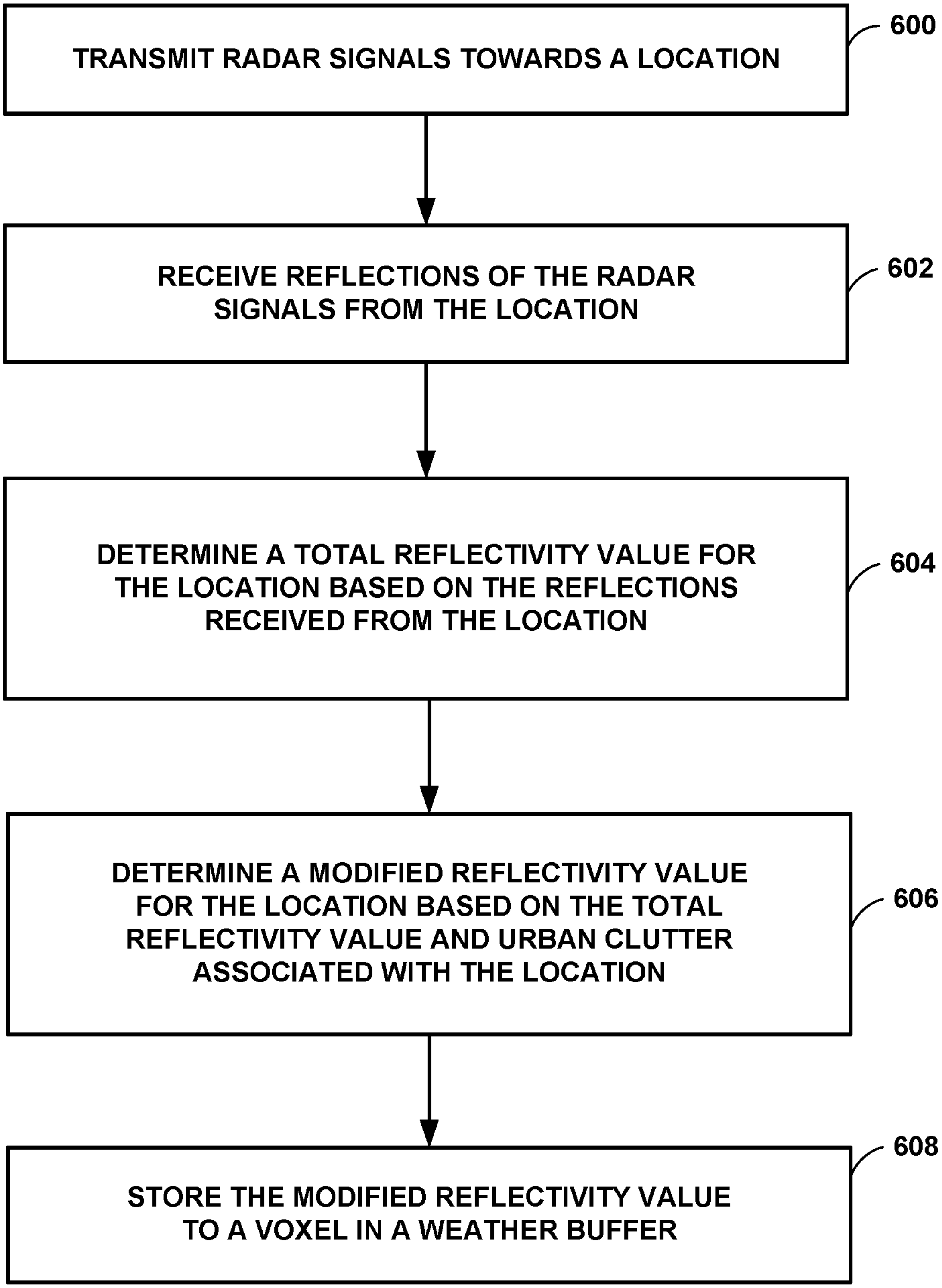
FIGS. 6 and 7 are flowcharts illustrating example processes for assigning reflectivity values to a weather buffer, in accordance with some examples of this disclosure.
Figure 7:
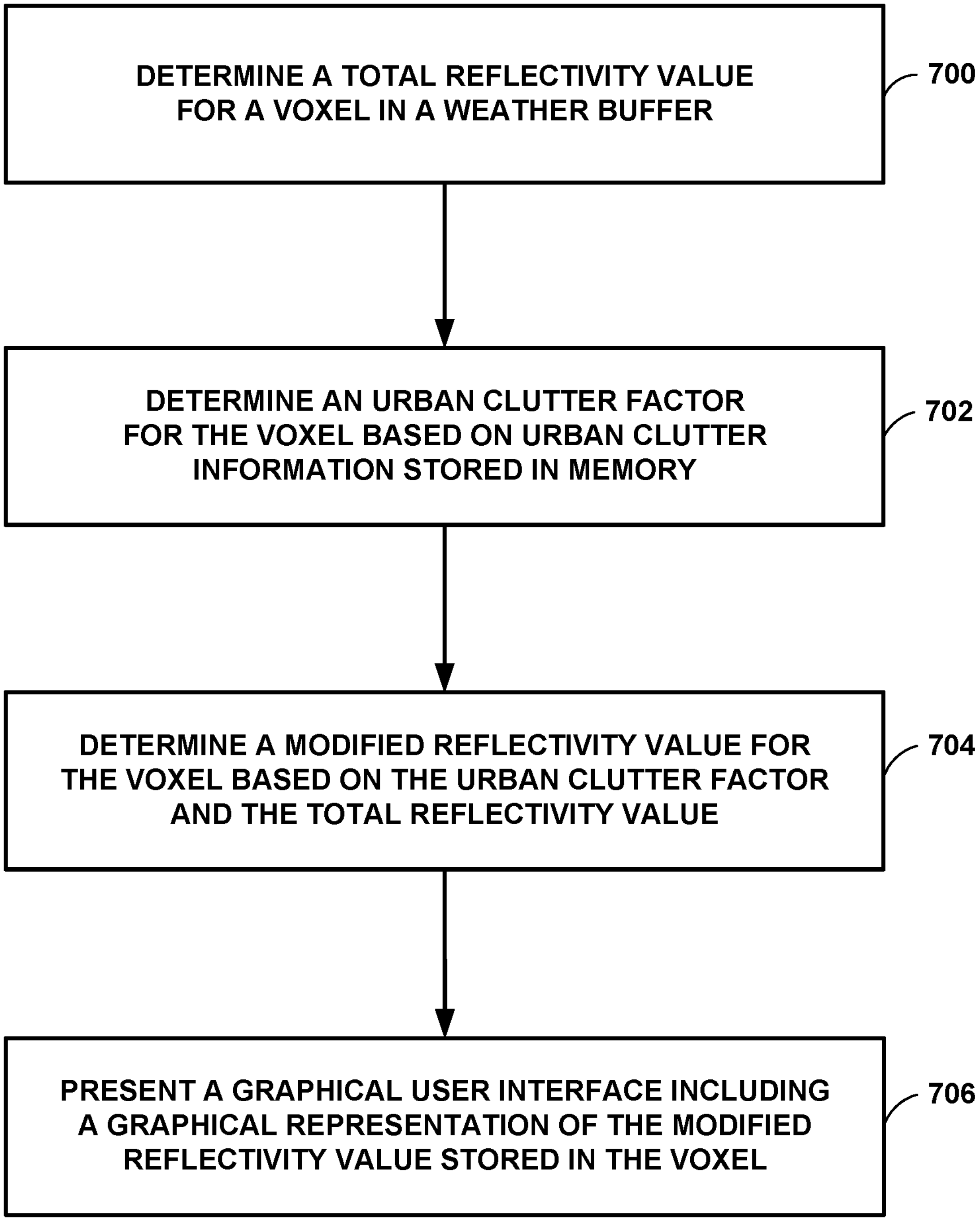

FIGS. 6 and 7 are flowcharts illustrating example processes for assigning reflectivity values to a weather buffer, in accordance with some examples of this disclosure. The example processes of FIGS. 6 and 7 is described with reference to system 510 shown in FIG. 5, although other components may exemplify similar techniques.

In the example of FIG. 6, antenna 522 transmits radar signals towards a location (600). The radar signals may be transmitted as pulses and/or as a continuous wave. Antenna 522 then receives reflections of the radar signals from the location (602). Processing circuitry 520 determines a total reflectivity value for the location based on the reflections received from the location (604). Processing circuitry 520 may be configured to form a receive beam pointed towards the location and use time of arrival to determine the power associated with the location.

Processing circuitry 520 may be configured to implement a predictor corrector model to determine a total reflectivity value for a location. For example, processing circuitry 520 may be configured to check whether heightened radar return values from a location persist for a sufficient time duration before storing those radar return values to weather buffer 532. Thus, reflectivity values may participate in weather buffer 532 at a lagged value.

In the example of FIG. 6, processing circuitry 520 determines a modified reflectivity value for the location based on the total reflectivity value and an urban clutter associated with the location (606). The modified reflectivity value may be the same as the total reflectivity value in voxels that have no potential for urban clutter, and the modified reflectivity value may be different than the total reflectivity value in voxels that have a potential for urban clutter. The modified reflectivity value may be less than the total reflectivity value in voxels with urban clutter because the reflectivity attributable to weather is assumed to be less than the total reflectivity. Processing circuitry 520 can determine the modified reflectivity value using an estimated percentage of the reflectivity that is due to urban clutter. Additionally or alternatively, processing circuitry 520 can subtract an expected urban clutter from the total reflectivity value. Processing circuitry 520 then stores or assigns the modified reflectivity value to a voxel in weather buffer 532 (608).

In the example of FIG. 7, processing circuitry 520 determines a total reflectivity value for a voxel in weather buffer 532 (700). Processing circuitry 520 also determines an urban clutter factor for the voxel based on urban clutter information stored in memory 530 (702). Processing circuitry 520 can retrieve the urban clutter information from urban clutter database 536. Processing circuitry 520 may use distribution model 537 and beam model 538 to determine the urban clutter factor based on where the urban area is located within a beam (e.g., in the main beam or in a side lobe). For example, based on the urban clutter information, processing circuitry 520 may determine that one half of the reflected power in the beam is attributable to urban clutter, and the other half is attributable to weather.

Processing circuitry 520 determines a modified reflectivity value for the voxel based on the urban clutter factor and the total reflectivity value (704). Processing circuitry 520 then presents a graphical user interface including a graphical representation of the modified reflectivity value stored in the voxel in weather buffer 532 (706). Processing circuitry 520 can present this graphical user interface via display 540 by causing display 540 to present the graphical user interface. Display 540 may have a first option to present a first graphical user interface indicating the reflectivity values stored in weather buffer 532 and a second option to present a second graphical user interface indicating the reflectivity values stored in non-weather buffer 534.

The following numbered examples demonstrate one or more aspects of the disclosure.

Example 1. A method includes determining, based on radar returns, a total reflectivity value for a first voxel of a weather buffer. The method also includes determining that a potential for urban clutter exists in the first voxel. The method further includes assigning a first portion of the total reflectivity value to the first voxel of the weather buffer in response to determining that the potential for urban clutter exists in the first voxel. The method includes assigning a second portion of the total reflectivity value to a corresponding voxel of a non-weather buffer in response to determining that the potential for urban clutter exists in the first voxel, where the corresponding voxel at least partially overlaps with the first voxel.

Example 2. A method includes transmitting radar signals towards a location and receiving reflections of the radar signals from the location. The method also includes determining a total reflectivity value for the location based on the reflections received from the location. The method further includes receiving clutter information associated with the location, where the clutter information indicates an expected reflection from a ground surface. The method includes determining a modified reflectivity value of the location based on the total reflectivity value and the clutter information associated with the location. The method also includes storing the modified reflectivity value.

Example 3. The method of the preceding examples or any combination thereof, further including determining that a first portion of the total reflectivity value is attributable to weather based on a representation of an urban area stored in an urban clutter database.

Example 4. The method of the preceding examples or any combination thereof, further including assigning the first portion of the total reflectivity value to the first voxel of the weather buffer, where the first portion of the total reflectivity value is less than the total reflectivity value.

Example 5. The method of the preceding examples or any combination thereof, further including determining a second portion of the total reflectivity value is attributable to the urban clutter based on a representation of an urban area stored in an urban clutter database.

Example 6. The method of the preceding examples or any combination thereof, further including assign the second portion of the total reflectivity value to a corresponding voxel of the non-weather buffer.

Example 7. The method of the preceding examples or any combination thereof, further including storing an urban clutter database to a local memory.

Example 8. The method of the preceding examples or any combination thereof, further including retrieving information from an urban clutter database.

Example 9. The method of the preceding examples or any combination thereof, further including determining that the potential for urban clutter exists in the first voxel based on information retrieved from an urban clutter database.

Example 10. The method of the preceding examples or any combination thereof, further including determining an urban clutter factor for the first voxel based on information retrieved from an urban clutter database.

Example 11. The method of the preceding examples or any combination thereof, further including retrieving a center position of an urban area from an urban clutter database.

Example 12. The method of the preceding examples or any combination thereof, further including retrieving a radius representing an extent of the urban area around a center position from an urban clutter database.

Example 13. The method of the preceding examples or any combination thereof, where an extent of the urban area at least partially overlaps with the first voxel.

Example 14. The method of the preceding examples or any combination thereof, further including determining an urban clutter factor based on a distance between a location in the first voxel and a center position of the urban area.

Example 15. The method of the preceding examples or any combination thereof, further including determining that the potential for urban clutter exists in the first voxel based on an urban clutter factor.

Example 16. The method of the preceding examples or any combination thereof, where an urban clutter factor is further based on a ratio of a radius and a distance between the location and a center position of the urban area.

Example 17. The method of the preceding examples or any combination thereof, where an urban clutter factor includes a number between zero and one.

Example 18. The method of the preceding examples or any combination thereof, where an urban clutter factor includes a percentage between zero and one hundred percent.

Example 19. The method of the preceding examples or any combination thereof, further including determining the first and second portions of the total reflectivity value based on the total reflectivity value and an urban clutter factor.

Example 20. The method of the preceding examples or any combination thereof, further including retrieving information from an urban clutter database by at least retrieving an intensity value for the urban area.

Example 21. The method of the preceding examples or any combination thereof, further including determining an urban clutter factor based on an intensity value and a distance between a location and a center position of the urban area.

Example 22. The method of the preceding examples or any combination thereof, further including transmitting radar signals and receiving reflections of the radar signals.

Example 23. The method of the preceding examples or any combination thereof, further including determining, based on reflections of radar signals received by an antenna, the total reflectivity value for the first voxel.

Example 24. The method of the preceding examples or any combination thereof, further including causing a display to present a graphical user interface including a graphical representation of the first portion of the total reflectivity value stored in the first voxel.

Example 25. The method of the preceding examples or any combination thereof, further including determining that the potential for urban clutter exists in the first voxel by at least determining that a wind turbine, an oil well pumpjack, a hydroelectric dam, an oil refinery, or an ethanol refinery exists in the first voxel.

Example 26. A system including a memory and processing circuitry configured to perform the method of the preceding examples or any combination thereof.

Example 27. A system includes a memory configured to store a weather buffer and a non-weather buffer. The system also includes processing circuitry configured to determine, based on radar returns, a total reflectivity value for a first voxel of the weather buffer and determine that a potential for urban clutter exists in the first voxel. The processing circuitry is also configured to assign a first portion of the total reflectivity value to the first voxel of the weather buffer in response to determining that the potential for urban clutter exists in the first voxel. The processing circuitry is further configured to assign a second portion of the total reflectivity value to a corresponding voxel of the non-weather buffer in response to determining that the potential for urban clutter exists in the first voxel, where the corresponding voxel at least partially overlaps with the first voxel.

Example 28. A system includes a memory configured to store an urban clutter database including a representation of an urban area, store a weather buffer, and store a non-weather buffer. The system also includes an antenna configured to transmit radar signals towards a location represented by a first voxel of the weather buffer. The antenna is also configured to receive reflections of the radar signals from the location. The system further includes processing circuitry configured to determine a total reflectivity value for the first voxel based on the reflections of the radar signals. The processing circuitry is also configured to determine that the first voxel at least partially overlaps with the urban area and determine that a potential for urban clutter exists in the first voxel in response to determining that the first voxel at least partially overlaps with the urban area. The processing circuitry is further configured to determine a first portion of the total reflectivity value is attributable to weather based on the representation of the urban area stored in the urban clutter database. The processing circuitry is further configured to assign the first portion of the total reflectivity value to the first voxel of the weather buffer, where the first portion of the total reflectivity value is less than the total reflectivity value. The processing circuitry is also configured to determine a second portion of the total reflectivity value is attributable to the urban clutter based on the representation of the urban area stored in the urban clutter database. The processing circuitry is further configured to assign the second portion of the total reflectivity value to a corresponding voxel of the non-weather buffer, where the corresponding voxel at least partially overlaps with the first voxel.

Example 29. The system of examples 26-28 or any combination thereof, where the memory is configured to store a non-weather buffer.

Example 30. The system of examples 26-28 or any combination thereof, where the processing circuitry is configured to assign a second portion of the total reflectivity value to a corresponding voxel of a non-weather buffer in response to determining that the potential for urban clutter exists in the first voxel.

Example 31. The system of examples 26-28 or any combination thereof, where the corresponding voxel at least partially overlaps with the first voxel.

Example 32. The system of examples 26-28 or any combination thereof, where the memory is further configured to store an urban clutter database.

Example 33. The system of examples 26-28 or any combination thereof, where the processing circuitry is configured to retrieve information from an urban clutter database.

Example 34. The system of examples 26-28 or any combination thereof, where the processing circuitry is configured to determine that the potential for urban clutter exists in the first voxel based on the information retrieved from an urban clutter database.

Example 35. The system of examples 26-28 or any combination thereof, where the processing circuitry is further configured to determine an urban clutter factor for the first voxel based on information retrieved from an urban clutter database.

Example 36. The system of examples 26-28 or any combination thereof, where the processing circuitry is configured to retrieve information from an urban clutter database by at least retrieving a center position of an urban area.

Example 37. The system of examples 26-28 or any combination thereof, where the processing circuitry is configured to retrieve information from an urban clutter database by at least retrieving a radius representing an extent of the urban area around a center position, where an extent of the urban area at least partially overlaps with the first voxel.

Example 38. The system of examples 26-28 or any combination thereof, where the processing circuitry is configured to determine an urban clutter factor based on a distance between a location in the first voxel and a center position of the urban area.

Example 39. The system of examples 26-28 or any combination thereof, where the processing circuitry is configured to determine that the potential for urban clutter exists in the first voxel based on an urban clutter factor.

Example 40. The system of examples 26-28 or any combination thereof, where an urban clutter factor is further based on a ratio of a radius and a distance between the location and a center position of the urban area.

Example 41. The system of examples 26-28 or any combination thereof, where an urban clutter factor includes a number between zero and one.

Example 42. The system of examples 26-28 or any combination thereof, where an urban clutter factor includes a percentage between zero and one hundred percent.

Example 43. The system of examples 26-28 or any combination thereof, where the processing circuitry is configured to determine the first and second portions of the total reflectivity value based on the total reflectivity value and an urban clutter factor.

Example 44. The system of examples 26-28 or any combination thereof, where the processing circuitry is configured to retrieve information from an urban clutter database by at least retrieving an intensity value for the urban area.

Example 45. The system of examples 26-28 or any combination thereof, where the processing circuitry is configured to determine an urban clutter factor based on an intensity value and a distance between a location and a center position of the urban area.

Example 46. The system of examples 26-28 or any combination thereof, further including an antenna configured to transmit radar signals and receive reflections of the radar signals.

Example 47. The system of examples 26-28 or any combination thereof, where the processing circuitry is configured to determine, based on reflections of radar signals received by the antenna, the total reflectivity value for the first voxel.

Example 48. The system of examples 26-28 or any combination thereof, where the processing circuitry is configured to cause a display to present a graphical user interface including a graphical representation of the first portion of the total reflectivity value stored in the first voxel.

Example 49. The system of examples 26-28 or any combination thereof, where the processing circuitry is configured to determine that the potential for urban clutter exists in the first voxel by at least determining that a wind turbine, an oil well pumpjack, a hydroelectric dam, an oil refinery, or an ethanol refinery exists in the first voxel.

Example 50. The system of examples 26-28 or any combination thereof, where the representation of the urban area includes a center position of the urban area.

Example 51. The system of examples 26-28 or any combination thereof, where the representation of the urban area includes a radius representing an extent of the urban area around a center position, where an extent of the urban area at least partially overlaps with the first voxel.

Example 52. A device includes a computer-readable medium having executable instructions stored thereon, configured to be executable by processing circuitry for causing the processing circuitry to perform the method of examples 1-25 or any combination thereof.

Example 53. A system including means for performing each of the method steps of examples 1-25 or any combination thereof.

This disclosure has attributed functionality to vehicles 100, 200, 300, and 500, systems 110 and 510, processing circuitry 520, antenna 522, memory 530, display 540, and positioning device 560. Some or all of these components may include any combination of integrated circuitry, discrete logic circuitry, analog circuitry. For example, processing circuitry 520 may include one or more processors. In some examples, vehicles 100 vehicles 100, 200, 300, and 500, systems 110 and 510, processing circuitry 520, antenna 522, memory 530, display 540, and positioning device 560 may include multiple components, such as any combination of one or more microprocessors, one or more DSPs, one or more ASICs, or one or more FPGAs, as well as other discrete or integrated logic circuitry, and/or analog circuitry. The techniques described in this disclosure may also be encoded in a non-transitory computer-readable storage medium, such as a memory mounted onboard vehicles 100, 200, and 300 and/or in the cloud. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system comprising:

a memory configured to store a weather buffer and an assignment factor database that associates assignment factors with locations; and processing circuitry configured to:

determine, based on radar returns, a total reflectivity value for a first voxel of the weather buffer;

determine a location of the system;

determine a location corresponding to the first voxel based on the location of the system;

retrieve, from the assignment factor database, a center position of an urban area and a radius representing an extent of the urban area around the center position, wherein the extent of the urban area at least partially overlaps with the first voxel;

determine, based on a distribution model associated with the urban area and a distance between the center position and the location corresponding to the first voxel, an assignment factor for the first voxel;

determine, based on the assignment factor for the first voxel, a first portion of the total reflectivity value that is attributable to the weather, wherein the first portion of the total reflectivity value is more than zero and less than the total reflectivity value;

assign the first portion of the total reflectivity value to the first voxel of the weather buffer;

determine a weather formation based on the first portion of the total reflectivity value for the first voxel; and cause a display device to display a graphical representation of the weather formation.

2. The system of claim 1, wherein the memory is configured to store a non-weather buffer, wherein the processing circuitry is configured to assign a second portion of the total reflectivity value to a corresponding voxel of the non-weather buffer based on the determined assignment factor, and wherein the corresponding voxel at least partially overlaps with the first voxel.

3. The system of claim 1, wherein the processing circuitry is configured to:

determine the assignment factor for the first voxel from the assignment factor database.

4. The system of claim 1, wherein the assignment factor is further based on a ratio of the radius and the distance between the location in the first voxel and the center position of the urban area.

5. The system of claim 1, wherein the processing circuitry is configured to determine the first and second portions of the total reflectivity value based on the total reflectivity value and the assignment factor.

6. The system of claim 1, wherein the processing circuitry is configured to:

retrieve information from the assignment factor database by at least retrieving an intensity value for the urban area; and determine the assignment factor based on the intensity value and the distance between the location in the first voxel and the center position of the urban area.

7. The system of claim 1, further comprising an antenna configured to transmit radar signals and receive reflections of the radar signals, wherein the processing circuitry is configured to determine, based on the reflections of the radar signals received by the antenna, the total reflectivity value for the first voxel.

8. The system of claim 1, wherein the processing circuitry is configured to determine the assignment factor for the first voxel by at least determining that a wind turbine, an oil well pumpjack, a hydroelectric dam, an oil refinery, or an ethanol refinery exists in the first voxel.

9. The system of claim 1, wherein to determine the location of the system, the processing circuitry is configured to determine the location of the system using a satellite navigation system.

10. The system of claim 1, wherein the assignment factor represents a percentage of the total reflectivity value that is the first portion of the total reflectivity value.

11. The system of claim 1, wherein the assignment factor represents an amount of reflectivity to be subtracted from the total reflectivity value to determine the first portion of the total reflectivity value.

12. A method comprising:

determining, based on radar returns, a total reflectivity value for a first voxel of a weather buffer;

determining a location of an aircraft;

determining a location corresponding to the first voxel based on the location of the aircraft;

retrieving, from an assignment factor database, a center position of an urban area and a radius representing an extent of the urban area around the center position, wherein the extent of the urban area at least partially overlaps with the first voxel;

determining, based on a distribution model associated with the urban area and a distance between the center position and the location corresponding to the first voxel, an urban clutter factor based on the location corresponding to the first voxel;

determining, based on the urban clutter factor for the first voxel, a first portion of the total reflectivity value that is attributable to the weather, wherein the first portion of the total reflectivity value is more than zero and less than the total reflectivity value;

assigning the first portion of the total reflectivity value to the first voxel of the weather buffer;

determining a weather formation based on the first portion of the total reflectivity value for the first voxel; and causing a display device to display a graphical representation of the weather formation.

13. The method of claim 12, further comprising:

retrieving information from the assignment factor database; and determining the urban clutter factor based on the information retrieved from the assignment factor database.

14. The method of claim 12, wherein determining the urban clutter factor for the first voxel comprises determining that a wind turbine, an oil well pumpjack, a hydroelectric dam, an oil refinery, or an ethanol refinery exists in the first voxel.

15. The method of claim 12, wherein determining the location of the aircraft comprise determining the location of aircraft using a satellite navigation system.

16. A system comprising:

a memory configured to:

store an assignment factor database including a representation of an urban area;

store a weather buffer; and store a non-weather buffer;

an antenna configured to:

transmit radar signals towards a location represented by a first voxel of the weather buffer; and receive reflections of the radar signals from the location; and processing circuitry configured to:

determine a total reflectivity value for the first voxel based on the reflections of the radar signals;

retrieve, from the assignment factor database, a center position of an urban area and a radius representing an extent of the urban area around the center position, wherein the extent of the urban area at least partially overlaps with the first voxel;

determine, based on a distribution model associated with the urban area and a distance between the center position and the location corresponding to the first voxel, an assignment factor for the first voxel in response to determining that the extent of the urban area at least partially overlaps with the first voxel;

determine, based on the assignment factor for the first voxel, a first portion of the total reflectivity value that is attributable to weather, wherein the first portion of the total reflectivity value is more than zero and less than the total reflectivity value;

assign the first portion of the total reflectivity value to the first voxel of the weather buffer;

determine a second portion of the total reflectivity value that is attributable to urban clutter based on the assignment factor; and assign the second portion of the total reflectivity value to a corresponding voxel of the non-weather buffer, wherein the corresponding voxel at least partially overlaps with the first voxel;

determine a weather formation based on the first portion of the total reflectivity value for the first voxel; and cause a display device to display a graphical representation of the weather formation.

* * * * *